United States Patent
Miyasaka et al.

(10) Patent No.: US 11,282,104 B2
(45) Date of Patent: Mar. 22, 2022

(54) PROVISION DEVICE, PROVISION METHOD AND NON-TRANSITORY COMPUTER READABLE STORAGE MEDIUM

(71) Applicant: YAHOO JAPAN CORPORATION, Tokyo (JP)

(72) Inventors: Manabu Miyasaka, Tokyo (JP); Masatsugu Shidachi, Tokyo (JP); Akira Tajima, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 684 days.

(21) Appl. No.: 15/872,229

(22) Filed: Jan. 16, 2018

(65) Prior Publication Data

US 2018/0240146 A1 Aug. 23, 2018

(30) Foreign Application Priority Data

Feb. 21, 2017 (JP) .............................. JP2017-030448

(51) Int. Cl.
*G06Q 30/02* (2012.01)
*G06F 17/16* (2006.01)
(Continued)

(52) U.S. Cl.
CPC ......... *G06Q 30/0242* (2013.01); *G06F 17/16* (2013.01); *G06N 20/00* (2019.01); *G06Q 50/01* (2013.01)

(58) Field of Classification Search
CPC .... G06Q 30/0242; G06Q 50/01; G06N 20/00; G06F 17/16
See application file for complete search history.

(56) References Cited

U.S. PATENT DOCUMENTS 8,615,442 B1 * 12/2013 Kapur .................. G06F 16/285
705/26.1
2012/0245996 A1 * 9/2012 Mendez ................ G06N 7/005
705/14.49
(Continued)

FOREIGN PATENT DOCUMENTS

JP 2002-140465 A 5/2002
JP 2005-235139 A 9/2005
(Continued)

OTHER PUBLICATIONS

Zha et al: ACM Transactions on Multimedia Computing, Communications, and Applicationsvol. 6Issue 3Aug. 2010 Article No. 13pp. 1-19https://doi.org/10.1145/1823746.1823747—available at: https://dl.acm.org/doi/abs/10.1145/1823746.1823747 (Year: 2010).*

(Continued)

*Primary Examiner* — Katherine Kolosowski-Gager
(74) *Attorney, Agent, or Firm* — Oliff PLC

(57) ABSTRACT

According to one aspect of an embodiment a provision device includes a generation unit that generates a distributed representation of each context on the basis of a relative connection that multiple contexts have. The provision device includes a provision unit that provides information representing a change between a distributed representation of a given context that is generated before distribution information about the given context is distributed and a distributed representation of the given context that is generated after the distribution information is distributed.

19 Claims, 6 Drawing Sheets

(51) Int. Cl.
    *G06Q 50/00*           (2012.01)
    *G06N 20/00*           (2019.01)

(56)           References Cited

U.S. PATENT DOCUMENTS

| | | | |
|---|---|---|---|
| 2014/0114745 A1* | 4/2014 | Bruich | G06Q 50/01 |
| | | | 705/14.44 |
| 2014/0280890 A1* | 9/2014 | Yi | H04L 67/22 |
| | | | 709/224 |
| 2014/0358667 A1* | 12/2014 | Beltramo, Jr. | G06Q 30/0245 |
| | | | 705/14.42 |
| 2015/0088635 A1* | 3/2015 | Maycotte | G06Q 30/0244 |
| | | | 705/14.43 |
| 2017/0034593 A1* | 2/2017 | Ray | G06Q 30/0242 |
| 2017/0076320 A1* | 3/2017 | Hughes | G06Q 30/0275 |
| 2018/0217990 A1* | 8/2018 | Kumar | G06F 16/9535 |
| 2020/0219126 A1* | 7/2020 | Perkins | G06Q 50/01 |

FOREIGN PATENT DOCUMENTS

| | | |
|---|---|---|
| JP | 2007-226460 A | 9/2007 |
| JP | 2016-207141 A | 12/2016 |

OTHER PUBLICATIONS

Oct. 24, 2017 Office Action issued in Japanese Patent Application No. JP 2017-030448.
May 23, 2017 Office Action issued in Japanese Patent Application No. JP 2017-030448.
Mar. 26, 2019 Japanese Office Action issued in Japanese Patent Application No. 2018-009712.

* cited by examiner

FIG.3

| LOG ID | LOG TYPE | USER ID | DATE AND TIME | LOG CONTENT | ... |
|---|---|---|---|---|---|
| LOG ID #1 | POST | USER #1 | DATE AND TIME #1 | A IS CUTE | ... |
| LOG ID #2 | SEARCH QUERY | USER #2 | DATE AND TIME #2 | B PRICE | ... |
| LOG ID #3 | POST | USER #1 | DATE AND TIME #3 | A IS ALSO LUXURY | ... |
| ... | ... | ... | ... | ... | ... |

FIG.4

| DISTRIBUTED REPRESENTATION SPACE ID | GENERATION DATE AND TIME | CORRESPONDING CONTEXT | DISTRIBUTED REPRESENTATION | ... |
|---|---|---|---|---|
| SPECE #1 | DATE AND TIME #4 | A | DISTRIBUTED REPRESENTATION #1 | ... |
| | | B | DISTRIBUTED REPRESENTATION #2 | ... |
| | | ... | ... | ... |
| SPECE #2 | DATE AND TIME #5 | A | DISTRIBUTED REPRESENTATION #3 | ... |
| | | B | DISTRIBUTED REPRESENTATION #4 | ... |
| | | ... | ... | ... |
| ... | ... | ... | ... | ... |

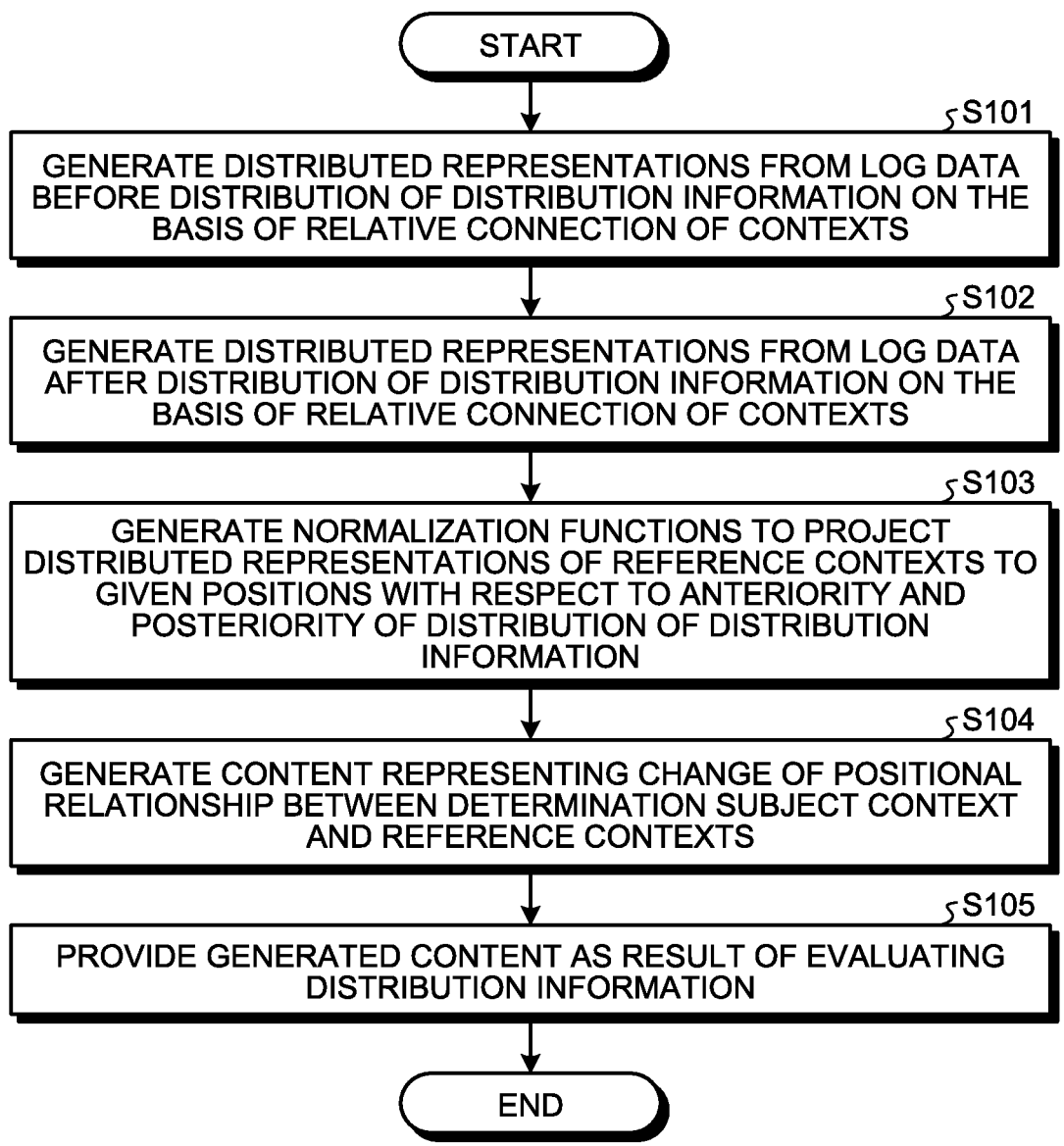

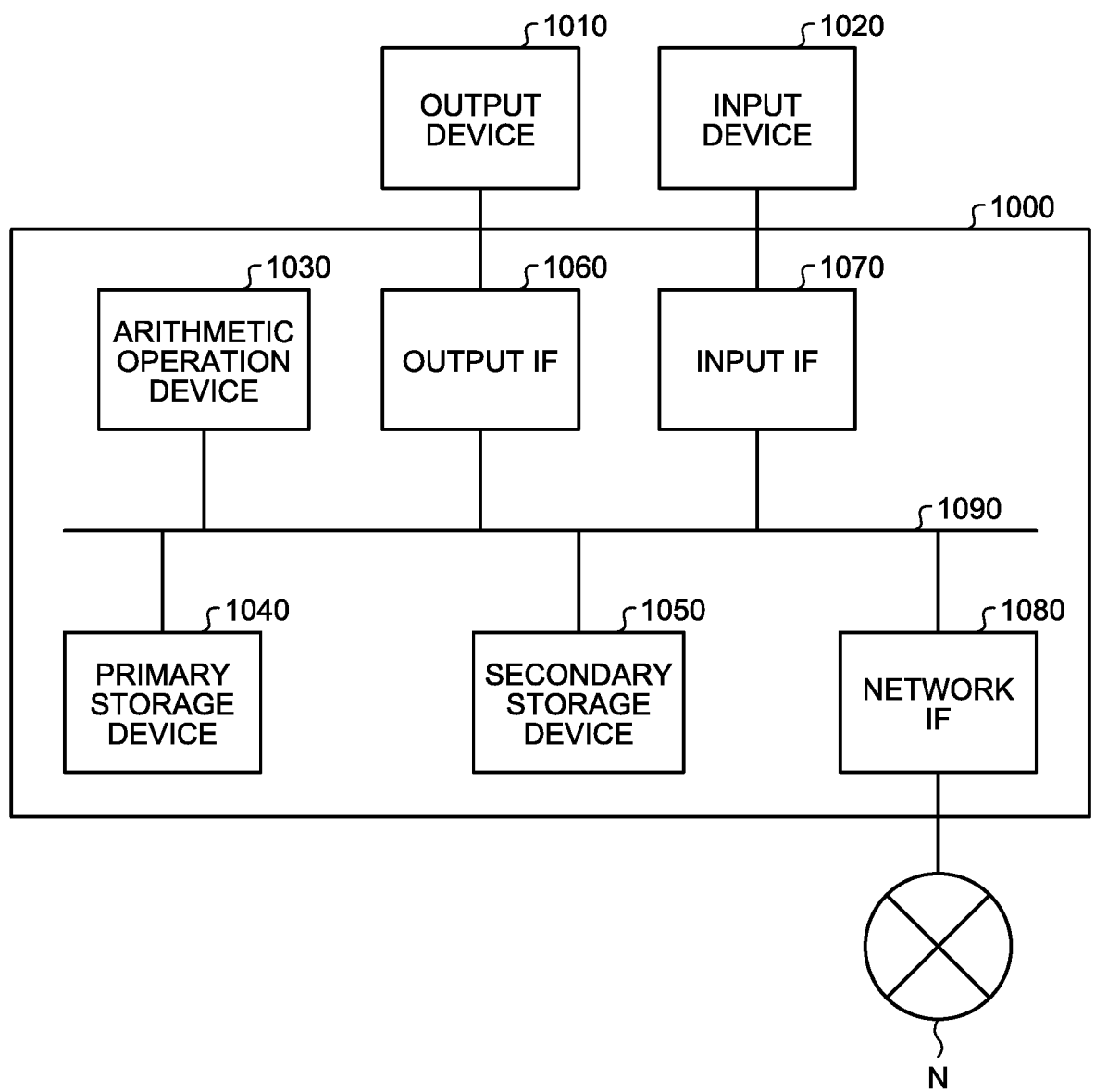

PROVISION DEVICE, PROVISION METHOD AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2017-030448 filed in Japan on Feb. 21, 2017.

BACKGROUND OF THE INVENTION

1. Field of the Invention

The present invention relates to a provision device, a provision method and a non-transitory computer readable storage medium.

2. Description of the Related Art

In recent years, with the astonishing widespread use of the Internet, information distribution via networks has been actively carried out. As an example of the information distribution, a technology of distributing information, such as advertisements or news (hereinafter, referred to as "distribution information"), about a given subject is known.

Furthermore, a method of evaluating the effect of distribution information on users has been proposed. For example, a method of evaluating to what extent distribution information has delivered information about a given subject to a user on the basis of the number of times the distribution information is browsed, the number of times the distribution information is chosen by the users, etc., is known.

Japanese Laid-open Patent Publication No. 2016-207141

The above-described technology however hardly evaluates the effect of the distribution information on the user's impression of the given subject properly.

In other words, the conventional technology only evaluates to what extent distribution information has delivered information about the given subject to the user and may hardly evaluate how the distribution information has changed the user's impression of the given subject.

SUMMARY OF THE INVENTION

It is an object of the present invention to at least partially solve the problems in the conventional technology.

According to one aspect of an embodiment a provision device includes a generation unit that generates a distributed representation of each context on the basis of a relative connection that multiple contexts have. The provision device includes a provision unit that provides information representing a change between a distributed representation of a given context that is generated before distribution information about the given context is distributed and a distributed representation of the given context that is generated after the distribution information is distributed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table illustrating exemplary information that is registered in a log database according to the embodiment;

FIG. 4 is a diagram illustrating exemplary information that is registered in a distributed representation space database according to the embodiment;

FIG. 7 is a flowchart illustrating a flow of a provision process that the information provision device according to the embodiment executes; and FIG. 8 is a diagram illustrating an exemplary hardware configuration.

DETAILED DESCRIPTION OF THE PREFERRED EMBODIMENTS

With reference to the accompanying drawings, modes for carrying out the provision device, the provision method and a non-transitory computer readable storage medium according to the present application (hereinafter, referred to as "embodiments") will be described in detail below with reference to the drawings. Note that the provision device, the provision method and the non-transitory computer readable storage medium according to the present application are not limited by the embodiments. In the following embodiments, the same components are denoted with the same reference number and redundant descriptions will be omitted.

Embodiment

1. About Process Provided by Information Provision Device

Figure 1:
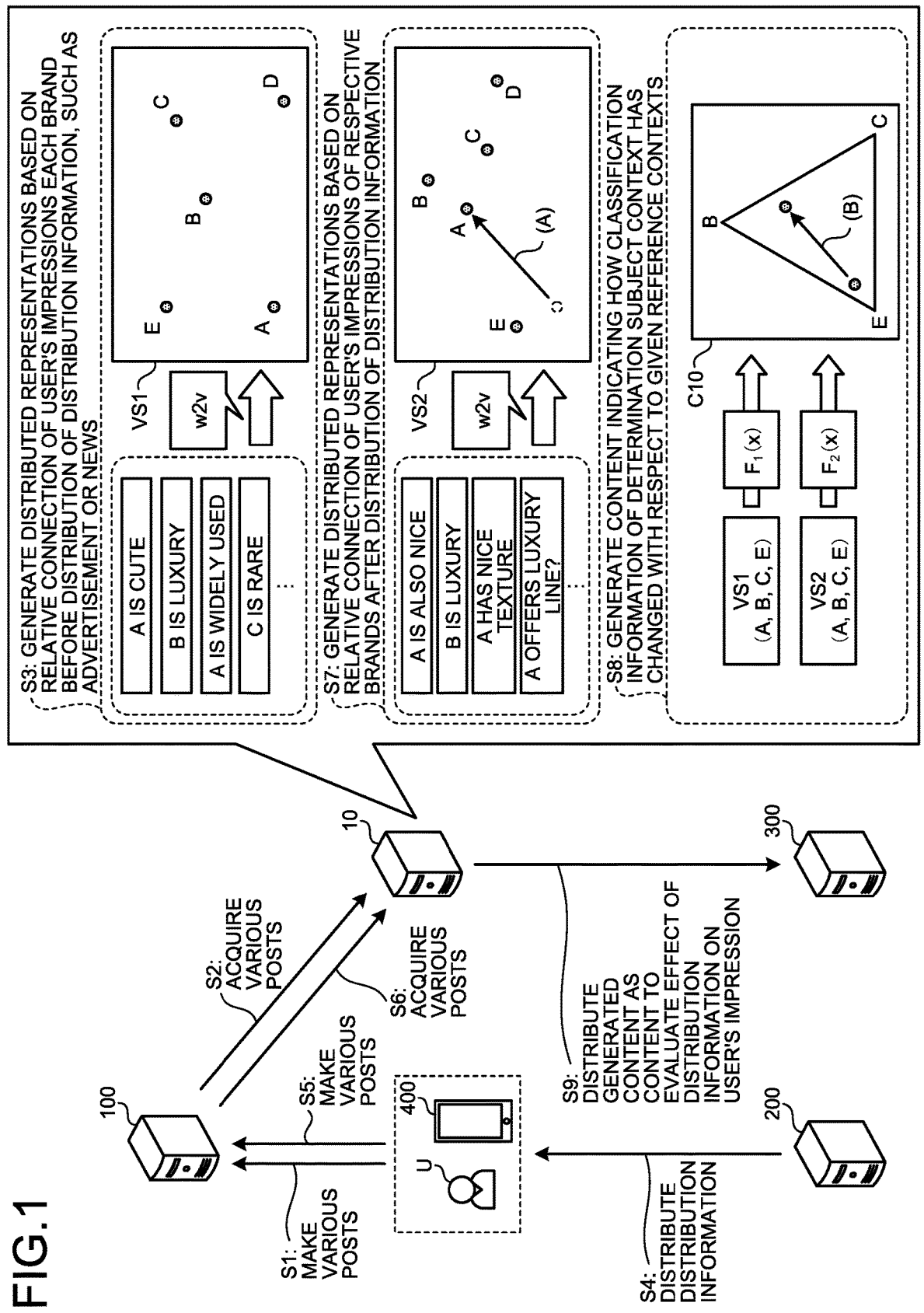
FIG. 1 is a diagram illustrating an exemplary provision process that an information provision device according to an embodiment executes.

First of all, FIG. 1 will be used to describe an exemplary provision process that an information provision device serving as an exemplary provision device executes. FIG. 1 is a diagram illustrating an exemplary provision process that the information provision device according to the embodiment executes.

The following descriptions describe, as a provision process that an information provision device 10 executes, an exemplary process of providing information for evaluating how distribution information about a given subject, such as an advertisement or news, has changed the user's impression of the given subject. Any subject, such as a predetermined product, service, store, brand or facility, may be used as the given subject, as long as distribution information, such as an advertisement or news, about the subject delivers information to a predetermined user. The given subject may a person like an actor, an animal or various types of content, such as a movie or music. In the following descriptions, the given subject relating to the distribution information is referred to as a "determination subject". In the following descriptions, the content relating to the determination subject, such as various types of content, including texts, images and sound, that reminds the user of various determination subjects will be referred to as a context representing the determination subject.

Any information other than advertisements and news may be used as the distribution information as long as the given information delivers information about the determination subject to the predetermined user. Advertisement is an idea including not only profitable or non-profitable advertising but also recruiting volunteers, public advertising, notification to the public, and other predetermined content. As long as the distribution information widely makes a notification of not only content containing so-called advertising-related information but also information about the predetermined subject that generates interest to the user or information contained in content relating to the predetermined subject (such as a landing page), an image, a video, texts, diagrams, symbols, hyperlinks and other any content may be contained together with texts. In the following descriptions, an exemplary provision process that is executed when an advertisement about a given brand is distributed as distribution information will be described.

1-1. Exemplary Information Provision Device

Figure 2:
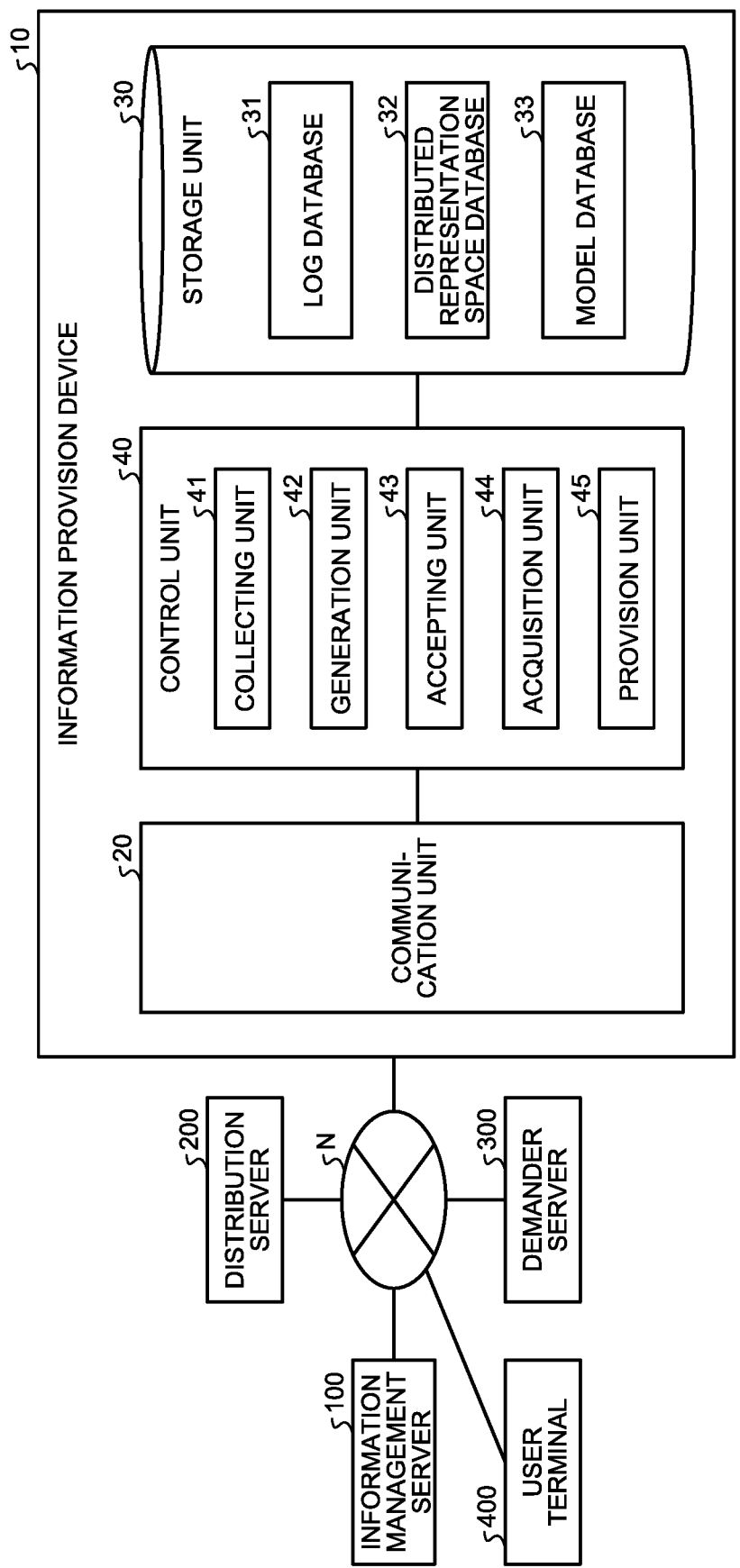
FIG. 2 is a diagram illustrating an exemplary configuration of the information provision device according to the embodiment.

The information provision device 10 is an information processing device that is able to communicate with an information management server 100, a distribution server 200, a demander server 300 and a user terminal 400 via a given network N, such as the Internet (see, for example, FIG. 2). For example, the information provision device 10 is realized by a server device, a cloud system, or the like. The information provision device 10 may be able to communicate with a predetermined number of devices from the information management server 100, the distribution server 200, the demander server 300 and the user terminal 400.

The information management server 100 is an information processing device that provides a predetermined web service to users and is realized by, for example, a server device or a cloud system. For example, the information management server 100 is a server device that provides various social networking services (SNS) that provide information posted by users to other users. The information management server 100 may be a server device that, on accepting posts of various types of content, such as a blog, a microblog, a web page, a message, a still image, a video and sound, disclosing the accepted content, thereby spreading various types of information about the content to the public.

The information management server 100 may be a server device that provides information about various dictionaries, news, etc., to users. The information management server 100 may be a server device that provides predetermined web services, such as portal sites, Internet auctions, electronic malls, web search, route search, map search, games, provision of real estates, provision of financial information, and services to preserve hotel facilities. The information management server 100 may be a server device that accepts evaluations by users on a predetermined subject, etc., and provides the evaluation results. The information management server 100 may be a server device that collects logs indicating the history of behaviors in the real world or on the network, such as the positional information and purchase history about a user. The information management server 100 described above manages various types of content posted by a predetermined user, the behavior history of the predetermined user, a history of searches by the predetermined user, information about a subject of electronic commerce, or the like.

The distribution server 200 is a server device that distributes various types of information, such as advertisements and news, to the user terminal 400 and that is realized by, for example, a server device or a cloud system. For example, when distributing information about an advertisement, the distribution server 200 performs listing on an advertisement to be distributed on the basis of the demographic attribute and the psychographic attribute of the user who uses the user terminal 400 and distributes the advertisement corresponding to the listing result to the user terminal 400. The distribution server 200 may distribute, in addition to advertisements, any information as long as the distribution server 200 distributes distribution information to the user terminal. The distribution server 200 may be realized integrally with the information management server 100.

The demander server 300 is an information processing device that a demander who demands information representing the effect of the distribution information uses and that is realized by a server device, a cloud system, or the like. For example, when an advertisement about the given subject is distributed as the distribution information, the demander server 300 is used by the demander, such as an advertiser, who demands the effect of the advertisement on the user.

The user terminal 400 is a terminal device that the predetermined user uses and that is realized by an information processing device, such as a personal computer (PC), a smart device, a mobile terminal device, a server device or a cloud system. For example, the user terminal 400 has a function of transmitting a post that the user inputs to the information management server 100, a function of displaying the information that the information management server 100 manages, and a function of delivering the content of distribution information by displaying the distribution information.

1-2. Exemplary Provision Process

A method of evaluating the effects of various types of information, such as advertisements and news, on users has been proposed. For example, a method of evaluating to what extent information about a subject relating to distribution information has been delivered to a user on the basis of the number of times the distribution information is browsed and the number of times the distribution information is chosen by the user, etc., has been known. The conventional technology however only evaluates to what extent distribution information has delivered information about a determination subject and, in some cases, hardly evaluates how the distribution information has changed the user's impression of the determination subject.

For example, distribution of an advertisement that leads a brand image a company has (that is, the user's image of the determination subject) may be requested. When such an advertisement is distributed, the conventional technology only represents how many times the advertisement has been browsed and hardly properly represents whether the advertisement actually has changed the brand image, that is, whether the advertisement actually has changed the user's impression of the company.

The information provision device 10 executes the following provision process. First of all, the information provision device 10 generates a distributed representation of each context on the basis of a relative connection that multiple contexts have. The information provision device 10 provides information representing a change between a distributed representation of a given context that is generated before distribution information about the given context is distributed and a distributed representation of the given context that is generated after the distribution information is distributed.

For example, the information provision device 10 acquires various types of information that the information management server 100 manages and sets, for contexts representing the determination subject (hereinafter, referred to as the "determination subject contexts"), various types of content including texts and images representing various determination subjects, such as a company name, a product name, a service name, a brand name, a facility name and a personal name, relating to the distribution information. The information provision device 10 then generates a distributed representation of each of the contexts by using a technology of converting each context into a multidimensional volume on the basis of the relative connection each context has, such as w2v (word2vec). The information provision device 10 may employ any technology other than w2v as long as the technology converts each context into a multidimensional volume on the basis of the relative connection each context has.

For example, the information provision device 10 accepts a determination subject context and a date and time on which distribution information advertising the determination subject is distributed from the demander server 300. In such a case, the information provision device 10 specifies a distributed representation that corresponds to the determination subject context and that is generated from information before the distribution of the distribution information and a distributed representation that corresponds to the determination subject context and that is generated from information after the distribution of the distribution information.

When the distribution information changes the user's impression of the determination subject, it is assumed that the distributed representation corresponding to the determination subject context has a difference between before and after the distribution of the distribution information. More specifically, when a distributed representation of a predetermined context is chosen as a reference, it is assumed that the distributed representation of the determination subject context changes with respect to the distributed representation of the context serving as the reference between anteriority and posteriority of the distribution of the distributed representation.

For example, assume that there are Brand A and Brand B and distribution information that causes the image of Brand B to approximate the image of Brand A is distributed. In such a case, when the distribution information has caused the image of Brand B to approximate Brand A, it is assumed that distributing the distribution information causes the distributed representation of Brand B to change to be similar to the distributed representation of Brand A. When the distribution informant has not caused the image of Brand B to approximate Brand A or has distanced the image of Brand B from Brand A, it is assumed that distributing the distribution information causes the distributed representation of Brand B to change such that the distributed representation of Brand B is not similar to the distributed representation of Brand A.

The information provision device 10 thus outputs information representing a change in the connection between the distributed representation of a context serving as a reference (hereinafter, referred to as the "reference context") and the distributed representation of the determination subject context as an index indicating whether the distribution information has changed the user's impression of the determination subject. As a result, the information provision device 10 is able to provide information indicating whether the distribution information has changed the user's impression.

1-3. About Generation of Distributed Representation

A process of generating a distributed representation of each context will be described. For example, the information provision device 10 collects other predetermined information, such as content posted by users, the histories of search queries, news, dictionaries and behavior information about users, from a predetermined server device, such as the information management server 100, on the network. In the following descriptions, various types of information the information provision device 10 collects in order to generate distributed representations may be referred to as "logs". Subsequently, the information provision device 10 extracts a predetermined context from the logs by executing a process, such as morphological analysis. The context is not limited to a context representing a determination subject.

On the basis of frequency of appearance of other words appearing together with each context, the information provision device 10 carries out learning by a learner that generates a distributed representation from a context such that distributed representations of contexts similar to each other are similar to each other and distributed representations of contexts not similar to each other are not similar to each other. In other words, the information provision device 10 generates a learner that performs vectorization of each context (that is, conversion into a distributed representation) on the basis of the relative connection the contexts have. The information provision device 10 then generates a distributed representation of each context by using the generated learner. In the following descriptions, a set of the distributed representations of the respective contexts may be referred to as a distributed representation space.

The information posted by the predetermined user may contain words representing the user's impression of the determination subject, such as "A is cute" or "B is luxury". When a distributed representation space of contexts is generated from such information, it is assumed that the user's impression of the determination subject is reflected in the distributed representation of each determination subject context. More specifically, with respect to multiple determination subjects of which impressions the user has are luxury, distributed representations similar to one another are generated from the corresponding contexts.

Thus, The information provision device 10 generates a distributed representation of each context from the information posted by the user, etc., by using a technology of converting each context into a multidimensional volume on the basis of the relative connection each context has. As a result, the information provision device 10 is able to generate a distributed representation of each context on the basis of the relative connection of the impressions of the determination subjects corresponding to the respective contexts the predetermined user has.

The information provision device 10 may generate a distributed representation space of contexts on the basis of predetermined information as long as the predetermined information may contain information representing the user's impression of each determination subject, such as the content posted by the predetermined user, the history of behaviors of the predetermined user, the search history of the predetermined user or information about the subject of electronic commerce.

Furthermore, the information provision device 10 need not reflect the user's impression of a determination subject on the basis of the adjectives contained in the same post, the same sentence, or the like. In other words, the information provision device 10 may estimate the impression of the determination subject relating to the post that User U has on the basis of not only the information posted by User U but also, for example, the biological information or the content of behavior at the time when User U makes the post and may generate the distributed representation reflecting the estimated impression. Alternatively, the impression of the determination subject that User U has may be estimated on the basis of whether User U frequently visits a shop or site relating to the determination subject and a distributed representation reflecting the estimated impression may be generated. In other words, the information provision device 10 may generate a distributed representation by using any method from any information as long as it is possible to reflect the relative impression of the determination subject that User U has.

1-4. About Exemplary Provision Process

An exemplary provision process that the information provision device 10 executes will be described. The following example describes an exemplary process of, when distribution information about Brand "A" is distributed, providing information to evaluate whether the distribution information has changed the impression. In the following descriptions, "User U" does not refer to a specific user but refers to many and unspecified users.

For example, User U posts various types of information on Brand "A" to the information management server 100 (step S1). For example, the user U posts information containing an impression of A, for example, "A is cute". In such a case, the information provision device 10 acquires various posts (step S2). The information provision device 10 then generates distributed representations based on the relative connections of the impressions of the respective brands the user has before distribution information, such as an advertisement or news, is distributed (step 3).

For example, the information provision device 10 extracts contexts "A", "B" and "C" that are contexts representing various brands from various types of information posted by User U, such as "A is cute", "B is luxury" and "C is rare" by using the analysis technology, such as morphological analysis. The information provision device 10 then converts "A", "B" and "C" into distributed representations, respectively, by using w2v such that the relative connection of the impressions the user has are reflected. For example, by using the learner that converts contexts of brands into distributed representations, the information provision device 10 generates distributed representations of the various brands "A", "B" and "C" such that distributed representations of brands of which impressions the user has are similar are similar to one another. The information provision device 10 generates a distributed representation space VS1 containing the distributed representations of the contexts of the respective brands (hereinafter, referred to as the "distributed representations of the respective brands"). The example illustrated in FIG. 1 represents exemplary distributed representation spaces each containing the distributed representations Brands "A" to "E".

The distribution server 200 distributes the distribution information, such as an advertisement or news of Brand "A" to the user terminal 400 of User U (step S4). The information management server 100 accepts again various posts posted by User U after the distribution information is distributed (step S5). The information provision device 10 then acquires various types of posts of User U again (step S6). The information provision device 10 then generates distributed representations based on the relative connection of the user's impression of the respective brands (that is, the contexts representing the respective brands) after the distribution of the distribution information (step S7). For example, the information provision device 10 generates distributed representations of the respective brands from the various types of information posted by User U, such as "A is also nice", "B is luxury", "The texture of A is nice" and "Does A offer a luxury line?", and generates a distributed representation space VS2 containing the generated distributed representations.

As it is assumed that distribution information about various brands is distributed to User U, it is also assumed that the user's impression of each brand may change over time. As it is thus assumed that the distributed representation of each brand changes every time a distributed representation is generated, it is assumed that it is difficult to evaluate the distribution information by using only the distributed representation of a single brand; however, if the distribution information is information that enables the impression of Brand "A" to approximate the impression of Brand "B", as represented by (A) in FIG. 1, the distributed representation of Brand "A" after the distribution of the distribution information at least approximate the distributed representation of Brand "B" more than the distributed representation of Brand "A" before the distribution of the distribution information.

The information provision device 10 thus generates content representing how the classification information about the determination subject context has changed with respect to a given reference context as information to evaluate the distribution information (step S8). For example, the information provision device 10 generates information representing the change between the difference between the distributed representation of the reference context and the distributed representation of the determination subject context that are generated before the distribution information is distributed and the difference between the distributed representations of the reference context and the distributed representation of the determination subject context that are generated after the distribution information is distributed. More specifically, the information provision device 10 generates information representing a change in the connection between the distributed representations of multiple reference contexts and the distributed representation of a given context.

For example, the information provision device 10 chooses the context of Brand "A" relating to the distribution information as the determination subject context. The information provision device 10 further chooses the contexts of Brands "B", "C" and "E" as reference contexts. For the choice of the determination subject context and the reference contexts, specifying by the demander who uses the demander server 300 may be accepted.

The information provision device 10 generates a first normalization function to project a distributed representation of a reference context before the distribution of the distribution information in a given position and a second normalization function to project a distributed representation of a reference context after the distribution of the distribution information in a given position. The information provision device 10 then provides information representing a position in which the distributed representation of the determination subject context before the distribution of the distribution information is projected by the first function and a position in which the distributed representation of the determination subject context after the distribution of the distribution information is projected by the second function. In other words, the information provision device 10 specifies a change of the distributed representation of the determination subject context by normalizing the changes of the distributed representations of the reference contexts by using the normalization functions.

For example, in the distributed representation space VS1, the information provision device 10 specifies the distributed representations of the reference contexts, that is, the distributed representations of contexts of Brands "B", "C" and "E". The information provision device 10 then calculates a normalization function $F_1(x)$ for projecting the distributed representations of the reference contexts in the distributed representation space VS1 to the respective given positions. For example, the information provision device 10 calculates a normalization function $F_1(x)$ to project the distributed representations of Brands "B", "C" and "E" in the distributed representation space VS1 to the vertices of an equilateral triangle in a given two-dimensional plane (hereinafter, referred to as the "output plane"). By using the normalization function $F_1(x)$, the information provision device 10 projects the distributed representation of Brand "A" in the distributed representation space VS1 onto the output plane. As a result, the information provision device 10 is able to generate a graph representing the impression of Brand "A" that the user has relatively to Brands "B", "C" and "E" before the distribution of the distribution information.

The information provision device 10 then specifies each of the distributed representations of the reference contexts, that is, the distributed representations of the contexts of Brands "B", "C" and "E" in the distributed representation space VS2 that is generated from posted information after the distribution of the distribution information. The information provision device 10 then calculates a normalization function $F_2(x)$ to project distributed representations of Brands "B", "C" and "E" in the distributed representation space VS2 to the vertices of an equilateral triangle on the output plane. By using the normalization function $F_2(x)$, the information provision device 10 then projects the distributed representation of Brand "A" in the distributed representation space VS2 onto the output plane. As a result, the information provision device 10 is able to generate a graph representing the impression of Brand "A" that the user has relatively to Brands "B", "C" and "E" after the distribution of the distribution information.

On projecting the distributed representations of the reference contexts to the given positions, respectively, the information provision device 10 generates information representing changes of the position in which the determination subject context is projected. For example, the information provision device 10 generates a graph C10 in which the graphs generated from the distributed representation space VS1 and the distributed representation space VS2 are superimposed such that the vertices and their corresponding brands match. In other words, the information provision device 10 specifies a change of the relative connection between the reference contexts and the determination subject context by normalizing the relative connection the contexts have with respect to each distributed representation space.

The information provision device 10 sets, on the graph C10, an arrow extending from the position in which the distributed representation of Brand "A" before the distribution of the distribution information is projected to the position in which the distributed representation of Brand "A" after the distribution of the distribution information is projected. As a result, the information provision device 10 is able to generate information representing the change of the impression of Brand "A" that the user has relatively to Brands "B", "C" and "E" as represented by (B) in FIG. 1.

The information provision device 10 then distributes the generated content as content to evaluate the effect of the distribution information on the user's impression to the demander server 300 (step S9). As a result, the demander is able to determine whether the distribution information distributed at step S4 actually has changed the impression of Brand "A".

In the case where the distributed representation of Brand "A" approximates the distributed representation of Brand "B", the demander is able to determine that the distribution information about Brand "A" has caused the impression of Brand "A" to approximate the impression of Brand "B". Furthermore, for example, in the case where the distributed representation of Brand "A" is distant from the distributed representation of Brand "E", the demander is able to determine that the distribution information on Brand "A" causes the impression of Brand "A" to be distant from the impression of Brand "E". When the distributed representation of Brand "A" does not shift with respect to Brands "B", "C" and "E", the demander is able to determine that the distribution information about Brand "A" does not shift the impression of Brand "A" with respect to the impressions of Brands "B", "C" and "E". In other words, the demander is able to determine whether the distribution information has changed the user's impression.

The information provided by the information provision device 10 may be used to evaluate the distribution information in a predetermined mode. For example, when the sales relating to Brand "A" increases in spite of a little change between before and after the distribution of the distribution information, the demander may determine that the distribution information is increasing the sales without changing the brand image. Furthermore, when the distributed representation of Brand "A" approximates the distributed representation of Brand "B" after the distribution information is distributed, the demander may determine that the distribution information causes the brand image of Brand "A" to approximate that of Brand "B".

As described above, the information provision device 10 generates a distributed representation of each context on the basis of the relative connection multiple contexts have. The information provision device 10 provides information representing a change between the distributed representation of a given context that is generated before distribution information on the given context is distributed and the distributed representation of the given context that is generated after the distribution information is distributed. For this reason, the information provision device 10 is able to provide a guide to evaluate the user's impression of a given context, such as a context of Brand "A".

2. About Variation of Provision Process

An exemplary provision process performed by the information provision device 10 has been described; however, the embodiments are not limited thereto. Variations of the provision process executed by the information provision device 10 will be described below.

2-1. About Impression of User

In the above-described example, the information provision device 10 reflects the user's impression of a determination subject in a distributed representation by converting a determination subject context into the distributed representation. The process is a process for reflecting the impression of the determination subject and, at the same time, is a process for reflecting the impression of the determination subject context. In other words, the user's impression to be reflected in the distributed representation is not only the impression of the determination subject but also an idea containing the impression of the context representing the determination subject.

For example, when there are multiple texts representing the same brand but in different fonts, the information provision device 10 may deal with the texts as individual contexts or as the same context. By executing such a process, the information provision device 10 may reflect the impression of the brand (that is, a determination subject) in a distributed representation or reflect the impression of each context representing the brand in the distributed representation.

2-2. About Information to be Provided

In the above-described example, the information provision device 10 provides information representing a change of the user's impression of a determination subject. The information provision device 10 herein may generate a distributed representation space every time distribution information is distributed and generate information representing a positional relationship between the distributed representations of reference contexts and the distributed representation of a determination subject context from each of the generated respective distributed representation spaces, thereby generating information representing the change of the user's impression chronologically. In other words, when distribution information is distributed for multiple times, the information provision device 10 may provide information representing a change that is a change of the distributed representation of the determination subject context and that occurs each time distribution information is distributed. For example, the information provision device 10 may generate and provide information representing the history of changes of the position in which the determination subject context is projected, that is, the history of changes of the user's impression of the determination subject.

The information provision device 10 may generate information representing the positional relationship between the distributed representations of the reference contexts and the distributed representation of the determination subject context each time distribution information is distributed or may generate information representing the positional relationship regardless of the timing at which distribution information is distributed. For example, the information provision device 10 generates distributed representation spaces at given time intervals and generates information representing a positional relationship between distributed representations of reference contexts and a distributed representation of a determination subject context. The information provision device 10 may represent how the user's impression of the determination subject has changed to the demander by outputting information representing the transition of the generated positional relationship.

The information provision device 10 may use any number of contexts as reference contexts. For example, when the information provision device 10 chooses n (natural number) contexts as reference contexts, the information provision device 10 may generate a normalization function to project the respective reference contexts to the respective vertices of a n-sided polygon (geometric shape consisting of n sides) and, by using the generated normalization function, project the distributed representation of the determination subject context, thereby generating information representing changes of the impressions of the reference contexts and the determination subject the user relatively has. Furthermore, the information provision device 10 may automatically choose reference contexts such that the distributed representation of the determination subject context is projected to the inner area of the n-sided polygon. When n reference contexts are chosen, projection may be performed on a n−1 dimensional unit and, for example, when projection is performed on a n-sided polygon from the n−1 dimensional unit, a normalization function to perform projection by using a given projection method (that is, ad-hoc projection method) that is set for each combination of the number of dimensions of the unit and the number of vertices of a polygon to which the distributed representation is projected. It is possible to use any method for the projection method.

When there are two reference contexts, by projecting the distributed representation of the determination subject context onto a line segment of the positions in which the respective reference contexts are projected, the information provision device 10 may generate information representing which of the reference contexts the impression of the determination subject has approximated.

The information provision device 10 may use contexts that belong to a category shared with the determination subject context as the reference contexts. For example, with respect to a food company and a technology-related company, it is assumed that the connections of relative impressions the user has are different from each other. Thus, for example, when the determination subject content is a context relating to a food company, the information provision device 10 may choose a context relating to another food company as a reference context.

When the contexts of the food company and the technology-related company are converted into distributed representations together, there is a risk that an error occurs between the user's actual impression of each company and the impression reflected in the distributed representation. For this reason, when the determination subject context is of a food company, the information provision device 10 may generate a distributed representation space where the context of each food company is converted into a distributed representation.

The information provision device 10 may output information representing the distributed representation space VS1 and information representing the distributed representation space VS2 with no change. For example, the information provision device 10 may project the distributed representation spaces VS1 and VS2 on a two-dimensional plane and generate and provide information representing a position in which the distributed representation of the determination subject context is projected. Furthermore, the information provision device 10 may exclude, from the information to be provided, information representing the distributed representations of contexts other than the reference contexts and the determination subject context among multiple contexts. For example, the information provision device 10 projects the distributed representation spaces VS1 and VS2 to the two-dimensional plane and exclude, from information to be displayed, distributed representations other than the distributed representation of the determination subject context and the distributed representations of the reference contexts.

The information provision device 10 may evaluate the distribution information on the basis of the change of the distributed representation of the determination subject context and may provide the result of evaluating the distribution information as information representing the change of the distributed representation. For example, when distribution information to cause the impression of Brand "A" approximate the impression of Brand "B" is distributed, the information provision device 10 calculates a distance between the distributed representation of Brand "A" and the distributed representation of Brand "B" (for example, a cosign distance or a humming distance) before the distribution of the distribution information and a distance between the distributed representation of Brand "A" and the distributed representation of Brand "B" after the distribution of the distribution information. When the distance before the distribution is shorter than the distance after the distribution, the information provision device 10 may generate an evaluation result representing that the distribution information has enabled the impression of Brand "A" to approximate the impression of Brand "B". When the distance before the distribution is longer than the distance after the distribution, the information provision device 10 may generate an evaluation result representing that the distribution information has not enabled the impression of Brand "A" to approximate the impression of Brand "B".

2-3. About Generation of Distributed Representation Space

The information provision device 10 herein may execute a predetermined process when generating a distributed representation space in order to clarify the connection between the distributed representation of the reference contexts and the distributed representation of the determination subject context. For example, the information provision device 10 may generate a distributed representation of each context such that the distributed representations of the reference contexts are distant from one another by a given threshold or higher. More specifically, when a reference context is chosen in advance, the information provision device 10 may carry out learning by a learner that converts contexts into distributed representations such that the distributed representations of the reference contexts are not similar to each other.

The information provision device 10 may convert a context serving as a guide (anchor) in a distributed representation space (hereinafter, referred to as "anchor") into a distributed representation. For example, the information provision device 10 extracts a given adjective, such as "high" or "cute", as an anchor from posts. The information provision device then generates distributed representations of the determination subject context and the anchor.

When such a distributed representation space is generated, the anchor serves as one index on what kind of impression of the determination subject the user has. The information provision device 10 may facilitate choosing reference contexts by providing information representing a distributed representation space containing the anchor to the demander. Furthermore, the information provision device 10 may provide information representing a change of the connection between a distributed representation of a given adjective and a distributed representation of a determination subject context.

2-4. About Mode of Application

The information provision device 10 is applicable to any mode other than the above-described embodiment as long as, when information, such as distribution information, is distributed, the information provision device 10 provides information representing how the user's impression of a determination subject has changed.

For example, the information provision device 10 may provide information representing a change between a distributed representation of a determination subject context that is generated before advertisement information advertising a determination subject context is distributed and a distributed representation of the determination subject context that is generated after the advertisement information is distributed. When executing such a process, the information provision device 10 is able to provide information indicating whether the advertisement has enabled the user's impression of the determination subject to be led properly.

For example, by specifying a change of a distributed representation of a given determination subject context between anteriority and posteriority of distribution of news as information to be distributed, the information provision device 10 may provide information indicating whether the news has changed the user's impression of the given determination subject. When such a process is executed, the distributed news and the determination subject context may have direct or indirect connection.

Furthermore, for example, the information provision device 10 generates distributed representations of a determination subject context at given time intervals and determines whether the generated distributed representation has changed. When the distributed representation changes in a certain period, the information provision device 10 may provide the fact that the distribution information distributed during that period has changes the user's impression to the demander.

3. Configuration of Information Provision Device

An exemplary functional configuration the above-described information provision device 10 will be described below. FIG. 2 is a diagram illustrating an exemplary configuration of the information provision device according to the embodiment. As illustrated in FIG. 2, the information provision device 10 includes a communication unit 20, a storage unit 30 and a control unit 40.

The communication unit 20 is realized by, for example, a network interface card (NIC), or the like. The communication unit 20 is connected to a network N in a wired or wireless manner and transmits and receives information to and from the information management server 100, the distribution server 200, the demander server 300 and the user terminal 400.

The storage unit 30 is realized by, for example, a semiconductor memory device, such as a random access memory (RAM) or a flash memory, or a storage device, such as a hard disk or an optical disk. The storage unit 30 stores a log database 31, a distributed representation space database 32 and a model database 33.

Various posts used to generate distributed representations are registered in the log database 31. For example, FIG. 3 is a diagram illustrating exemplary information that is registered in the log database according to the embodiment. In the example illustrated in FIG. 3, information, such as a "log identifier (ID)", a "log type", a "user ID", a "date and time" and "log content", is registered in the log database 31.

A "log ID" is an identifier that identifies a log. A "log type" is information indicating whether the log indicated by the "log ID" associated with the "log type" is, for example, a SNS post or a search query. A "user ID" is an identifier of a user having a connection with the log indicated by the "log ID" associated with the "user ID". A "date and time" indicates a date and time on which the log indicated by the "log ID" associated with the "date and time" is posted on the network. Furthermore, "log content" refers to various types of content collected as logs.

For example, in the example illustrated in FIG. 3, sets of information, such as a log ID "LOG ID #1", a log type "POST", a user ID "USER #1", a date and time "DATE AND TIME #1" and log content "A IS CUTE", are registered in association with one another in the log database 31. The information indicates that the log content "A IS CUTE" is registered by the user indicated by the user ID "USER #1" as the log indicated by the log ID "LOG ID #1" and as the content posted at the date and time indicated by the date and time "DATE AND TIME #1".

The example illustrated in FIG. 3 represents conceptual values including "LOGID #1", "USER #1" and "DATE AND TIME #1"; however, character strings identifying logs and users and character strings representing dates and times are registered practically in the log database 31. In the log database 31, any information may be registered in addition to the information illustrated in FIG. 3 as long as the information relates to various types of information to be collected as logs. The example illustrated in FIG. 3 represents the example where content posted by the user and an input search query are registered as log types; however, practically, various types of content, such as news, dictionaries and web pages, and information indicating the type of each set of content are registered in the log database 31.

FIG. 2 will be referred back and the description will be continued. In the distributed representation space database 32, generated distributed representation spaces are stored. For example, FIG. 4 is a diagram illustrating exemplary information that is registered in the distributed representation space database according to the embodiment. In the example illustrated in FIG. 4, sets of information, such as a "distributed representation space ID", a "generation date and time", a "corresponding context" and a "distributed representation", are registered in association with one another in the distributed representation space database 32. Any information may be registered in addition to the information illustrated in FIG. 4 in the distributed representation space database 32 as long as, for example, the information relates to the distributed representation.

A "distributed representation space ID" is an identifier that identifies a distributed representation space. A "generation date and time" is information representing a date and time on which a distributed representation space indicated by a "distributed representation space ID" associated with the "generation date and time" is generated, that is, a date and time on which the distributed representation contained in the distributed representation space represented by the associated "distributed representation space ID" is generated. A "corresponding context" is information representing a context from which the distributed representation originates. A "distributed representation" is a distributed representation of a "corresponding context" associated with the "distributed representation".

For example, in the distributed representation space database 32, sets of information including a distributed representation space ID "SPACE #1", a generation date and time "DATE AND TIME #4", a corresponding context "A" and a distributed representation "DISTRIBUTED REPRESENTATION #1" are registered in association with one another. The information indicates that the distributed representation of the corresponding text "A" that is generated on the date and time indicated by the generation date and time "DATE AND TIME #4" is the distributed representation "DISTRIBUTED REPRESENTATION #1" as the distributed representation contained in the distributed representation space indicated by the distributed representation ID "SPACE #1".

The example illustrated in FIG. 4 represents conceptual values, such as "SPACE ID #1", "DATE AND TIME #1" AND "A"; however, practically, character strings indicating distributed representation spaces and dates and times and content, such as texts and images serving as contexts, are registered in the distributed representation space database 32.

FIG. 2 will be referred back and the description will be continued. In the model database 33, a model for converting a context into a distributed representation is registered. For example, a leaner that classifies each context according to similarity of each context and regards the similarity between user's impressions of contexts (or determination subjects indicated by the contexts) contained in logs as an element to classify each context is registered as a model in the model database 33. Such a model is realized by, for example, a learner that classifies each context on the basis of the rate at which another word class, such as an adjective, appearing with a context or similarity thereof. For example, the model may be realized by a multi-stage neural network, such as convolutional neural networks (CNN), or may be realized by, for example, a classifier, such as a support vector machine (SVM), as long as the above-described functions are realized.

The control unit 40 is a controller and is realized by, for example, a processor, such as a central processing unit (CPU) or a micro processing unit (MPU), by executing various programs sored in a storage device in the information provision device 10 in a RAM, or the like, serving as a work area. The control unit 40 is a controller and, for example, the control unit 40 may be realized by an integrated circuit, such as an application specific integrated circuit (ASIC) or a field programmable gate array (FPGA). The control unit 40 serves as an arithmetic processing device that reads indices.

As illustrated in FIG. 2, the control unit 40 includes a collecting unit 41, a generation unit 42, an accepting unit 43, an acquisition unit 44 and a provision unit 45. The collecting unit 41 collects various logs from the predetermined information management server 100. For example, the collecting unit 41 collects various logs, such as sets of content posted by the user, the history of behaviors of the user, the history of search queries of the user, and information including evaluation on a subject of electronic commerce and web pages of electronic commerce, and registered the collected logs in the log database 31.

The generation unit 42 generates a distributed representation of each context on the basis of the relative connection that multiple contexts have. More specifically, the generation unit 42 generates vectors indicating the respective contexts as distributed representations by using the model to convert each context into a vector on the basis of the relative connection that the multiple contexts have.

For example, the generation unit 42 extracts various logs that are posted during a given period from the various types of information that are registered as logs in the log database 31 and extracts contexts from the extracted logs. By using the model that is registered in the model database 33, the generation unit 42 converts the contexts into distributed representations on the basis of the similarity of the extracted contexts. The generation unit 42 then registers a date and time on which a distributed representation is generated and a distributed representation space ID in association with a set of a generated distributed representation and a context from which the distributed representation originates in the distributed representation space database 32.

The generation unit 42 may generate distributed representations from all the logs registered in the log database 31 at given time intervals and register the generated distributed representations as distributed representation spaces different according to the respective sets of timings at which the distributed representations are generated in the distributed representation space database 32. Furthermore, the generation unit 42, for example, may generate multiple distributed representations from the logs of posts, or the like, made within a day from the date and time on which a distributed representation is generated and may register the generated multiple distributed representations as a distributed representation space in the distributed representation space database 32. In other words, the generation unit 42 may generate a distributed representation space reflecting user's impressions within a given period with respect to each period.

When reference contexts are set in advance, the generation unit 42 may generate a distributed representation of each context such that the distributed representations of the reference contexts are distant from one another by a given threshold or larger. Furthermore, the generation unit 42 may generate distributed representations of multiple contexts and a given adjective.

The accepting unit 43 accepts specifying a determination subject context and reference contexts from a demander and accepts specifying a date and time about which a change of the determination subject context is determined. For example, the accepting unit 43 accepts specifying a date and time on which distribution information about a determination subject is distributed as the date and time about which a change of the determination subject context is determined. In the following descriptions, the date and time about which a change of the determination subject context is determined will be referred to as a specified date and time.

The acquisition unit 44 acquires distributed representations of the determination subject context and the reference contexts before the specified date and time and distributed representations of the determination subject context and the reference contexts after the specified date and time. For example, the acquisition unit 44 refers to the distributed representation space database 32, chooses a distributed representation space that is generated just before the specified date and time and a distributed representation space that is generated just after the specified date and time. The acquisition unit 44 acquires the distributed representation that is associated with the determination subject context and the distributed representations associated with the reference contexts from each of the specified distributed representation spaces. In other words, the acquisition unit 44 acquires the distributed representation of the determination subject context that is generated before the distribution information about the determination subject context is distributed and the distributed representation of the determination subject context that is generated after the distribution information is distributed. The acquisition unit 44 then outputs each of the specified distributed representations to the provision unit 45.

The provision unit 45 provides information representing the change between the distributed representation of the determination subject context that is generated before the distribution information about the determination subject context is distributed and the distributed representation of the determination subject context that is generated after the distribution information is distributed. For example, the provision unit 45 provides information representing a change between a distributed representation of a determination subject context that is generated before advertisement information advertising the determination subject context is distributed and a distributed representation of the determination subject context that is generated after the advertisement information is distributed. Furthermore, for example, the provision unit 45 generates a distributed representation of each context on the basis of the relative connection of a predetermined user's impressions of subjects that the contexts represent.

The provision unit 45 generates information representing a change of the connection between the distributed representations of the reference contexts and the distributed representation of the determination subject context. More specifically, the provision unit 45 specifies the difference between the distributed representation of a reference context and the distributed representation of the determination subject context that are generated before the distribution information is distributed and the difference between the distributed representation of the reference context and the distributed representation of the determination subject context that are generated after the distribution information is distributed and generates information indicating a change between the specified differences. For example, the provision unit 45 generates information indicating a change of the connection between the distributed representations of multiple reference contexts and the distributed representation of a determination subject context.

An exemplary process that is executed by the provision unit 45 will be described below. For example, the provision unit 45 accepts, as the distributed representation of the determination subject context, a distributed representation that represents a context of Brand "A" (referred to as "Distributed Representation A" below) and that is generated before distribution information about Brand "A" is distributed from the acquisition unit 44. Furthermore, for example, the provision unit 45 accepts, as the distributed representations of the reference contexts, distributed representations representing contexts of Brand "B", Brand "C" and Brand "E" (referred to as "Distributed Representation B", "Distributed Representation C" and "Distributed representation E" below) and that are generated before the distribution information about Brand "A" is distributed and the distributed representations generated after the distribution from the acquisition unit 44.

In such a case, when the provision unit 45 projects the distributed representations of the reference contexts to given positions, respectively, the provision unit 45 generates information representing a change of the position in which the determination subject contexts is projected. For example, the provision unit 45 generates a first normalization function to project Distributed Representation B, Distributed Representation C and Distributed representation E that are generated before the distribution information about Brand "A" is distributed to the vertices of a equilateral triangle in a given size. The provision unit 45 further generates a second normalization function to project Distributed Representation B, Distributed Representation C and Distributed representation E that are generated after the distribution information about Brand "A" is distributed to the vertices of a equilateral triangle in a given size.

By using the first normalization function, the provision unit 45 projects Distributed Representation A that is generated before the distribution information is distributed onto the equilateral triangle having the vertices with which the distributed representations of the reference contexts are associated. By using the second normalization function, the provision unit 45 further projects Distributed Representation A that is generated after the distribution information is distributed onto the equilateral triangle having the vertices with which the distributed representations of the reference contexts are associated. In other words, when the provision unit 45 projects the distributed representations of the reference contexts to the vertices of a polygon, the provision unit 45 generates information representing a change of the position in the area of the polygon to which the determination subject context is projected. For example, when the number of reference contexts is two, the provision unit 45 may generate a normalization function to project the reference contexts to the vertices of a line segment and, by using the generated normalization function, projects the determination subject context onto the line segment, thereby generating information representing a change of the impression of the determination subject.

Figure 5:
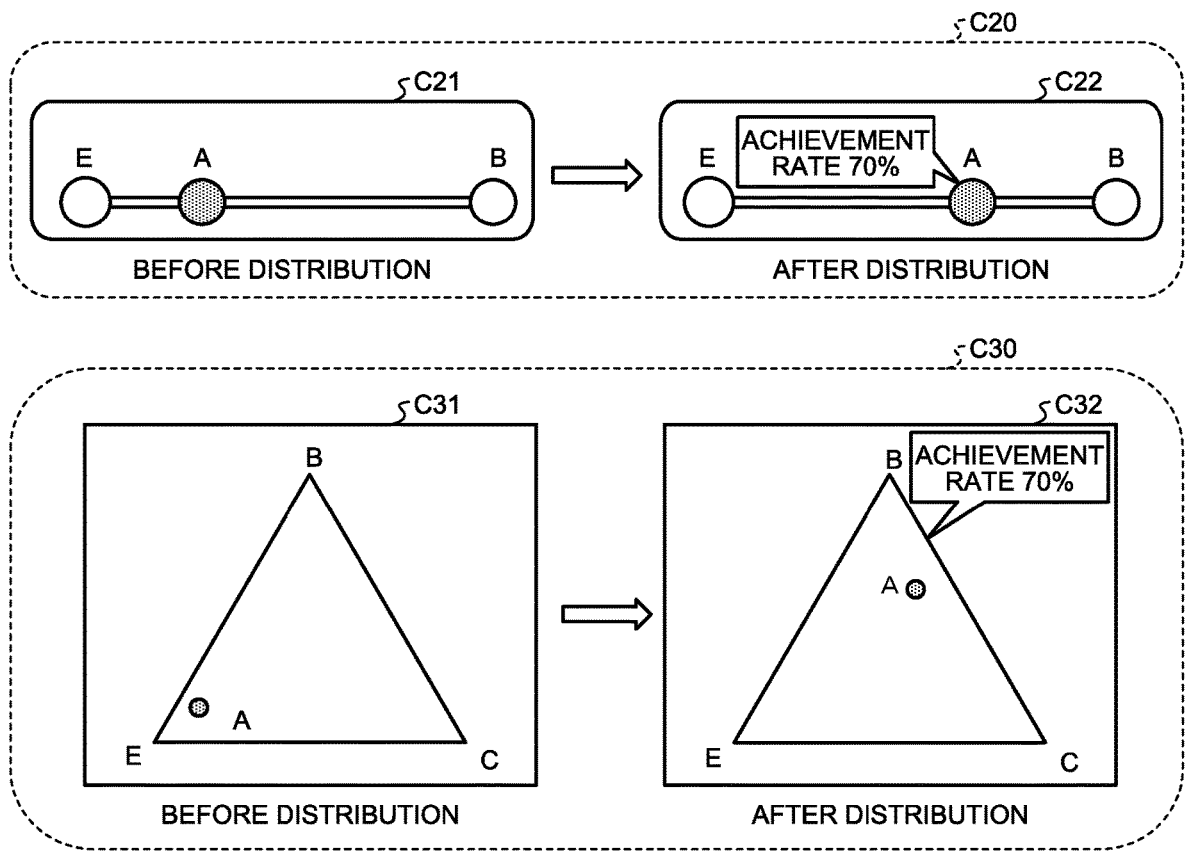
FIG. 5 is a diagram illustrating exemplary information that the information provision device according to the embodiment generates.

For example, FIG. 5 is a diagram illustrating exemplary information that the information provision device according to the embodiment generates. The example illustrated in FIG. 5 represents, as exemplary information that is generated by the information provision device 10, exemplary Content C20 representing a change of the impression of Brand "A" when the contexts of Brand "B" and Brand "E" serve as reference contexts and exemplary Content C30 representing a change of the impression of Brand "A" when the contexts of Brand "B", Brand "C" and Brand "E" serve as reference contexts.

First of all, an exemplary process of generating Content C20 will be described. For example, the information provision device 10 generates a first normalization function to project Distributed representation E and Distributed Representation B that are generated before distribution information about Brand "A" is distributed to the vertices of a line segment having a given length and, by using the first normalization function, projects Distributed Representation A that is generated before the distribution information is distributed onto the line segment. The information provision device 10 generates, as pre-distribution content, Content C21 in which circular icons are arranged respectively in the vertices and the position to which Distributed Representation A is projected and the corresponding contexts "E", "A" and "B" are arranged.

The information provision device 10 further generates a second normalization function to project Distributed representation E and Distributed Representation B that are generated after the distribution information about Brand "A" is distributed to the vertices of the line segment having the given length and, by using the second normalization function, projects Distributed Representation A that is generated after the distribution information is distributed onto the line segment. The information provision device 10 generates, as post-distribution content, Content C22 in which circular icons are arranged respectively in the vertices and the position to which Distributed Representation A is projected and the corresponding contexts "E", "A" and "B" are arranged.

The information provision device 10 further generates information indicating to what extent Distributed Representation A has approximated Distributed Representation B between anteriority and posteriority of the distribution of the distribution information. For example, when the distance (similarity) between Distributed Representation A and Distributed Representation B after the distribution of the distribution information is approximately 30% of the distance between Distributed Representation A and Distributed Representation B before the distribution of the distribution information, the information provision device 10 arranges information indicating to what extent the distribution of the distribution information has caused Distributed Representation A to approximate Distributed Representation B, such as "Achievement Rate 70%", in Content C22.

An exemplary process of generating Content C30 will be described. For example, the information provision device 10 generates a first normalization function to project Distributed Representation B, Distributed Representation C and Distributed representation E that are generated before the distribution information is distributed to the respective vertices of the equilateral triangle and, by using the first normalization function, projects Distributed Representation A that is generated before the distribution information is distributed to the equilateral triangle. The information provision device 10 generates, as pre-distribution content, Content C31 in which a circular icon is arranged in the position to which Distributed Representation A is projected and Contexts "E", "B", "C" and "A" corresponding respectively to the vertices and the circular icon are arranged.

The information provision device 10 generates a second normalization function to project Distributed representation B, Distributed Representation C and Distributed representation E that are generated after the distribution information is distributed to the respective vertices of the equilateral triangle and, by using the second normalization function, projects Distributed Representation A that is generated after the distribution information is distributed to the equilateral triangle. The information provision device 10 generates, as post-distribution content, Content C32 in which a circular icon is arranged in the position to which Distributed Representation A is projected and in which Contexts "E", "B", "C" and "A" corresponding to the vertices and the circular icon, respectively, are arranged.

When the distance between Distributed Representation A and Distributed Representation B after the distribution of the distribution information is approximately 30% of the distance between Distributed Representation A and Distributed Representation B before the distribution of the distribution information, the information provision device 10 arranges information indicating to what extent the distribution of the distribution information has caused Distributed Representation A to approximate Distributed Representation B, such as "Achievement Rate 70%", in Content C32. The information provision device 10 may visually represent the shift of Distributed Representation A by superimposing the pre-distribution content and the post-distribution content and arranging an arrow connecting the position of Distributed Representation A before the shift and the position after the shift.

The provision unit 45 may provide information indicating the history of changes of the position to which the determination subject context is projected. For example, when distribution information is distributed for multiple times, the provision unit 45 may generate information representing the change of the distributed representation of the determination subject context occurring each time distribution information is distributed.

Figure 6:
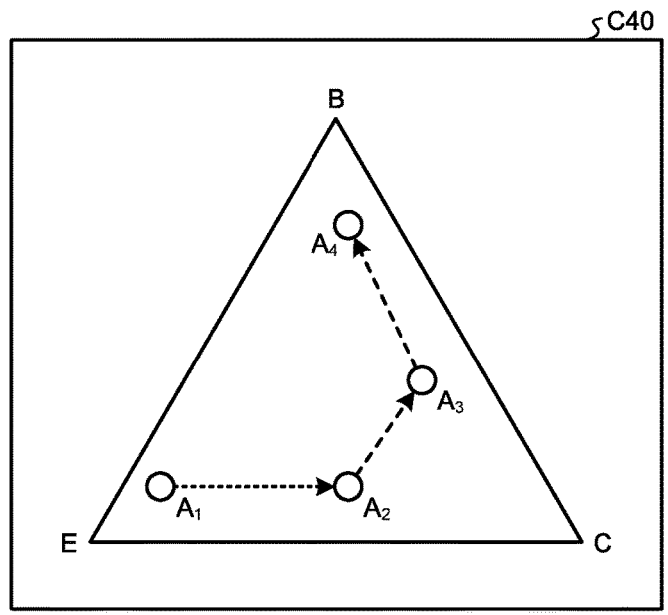
FIG. 6 is a diagram illustrating exemplary information representing a history of changes of a distributed representation that the information provision device according to the embodiment provides.

For example, FIG. 6 is a diagram illustrating exemplary information representing the history of changes of the distributed representation that the information provision device according to the embodiment provides. The example illustrated in FIG. 6 represents exemplary Content C40 representing the history of changes of the impression of Brand "A" when the contexts of Brand "B", Brand "C" and Brand "E" serve as reference contexts. The example illustrated in FIG. 6 represents exemplary Content C40 that is generated when a change of the user's impression of Brand "A" is determined for four times individually.

For example, the information provision device 10 projects Distributed Representation $A_1$ that is generated at a first timing by using the first normalization function to project Distributed Representation B, Distributed Representation C and Distributed representation E that are generated at the first timing to the vertices of an equilateral triangle. In the same manner, the information provision device 10 projects Distributed representations $A_2$ to $A_4$ that are generated at second to fourth timings by using the second to fourth normalization functions to project Distributed Representation B, Distributed Representation C and Distributed representation E that are generated at the first to fourth timings to the vertices of the equilateral triangle. As illustrated in FIG. 6, the information provision device 10 arranges arrows connecting Distributed representations $A_1$ to $A_4$, that is, arrows representing the transition of the user's impression of Brand "A". Accordingly, the information provision device 10 is able to represent how the distribution information has changed the user's impression of Brand "A" in comparison with the reference contexts.

In the example illustrated in FIG. 6, the first to fourth timings may correspond, or does not necessarily correspond, to the sets of timing at each of which distribution information corresponding to Brand "A" is transmitted. For example, the information provision device 10 may generate Content C40 indicating how the distribution information distributed at each of the sets of timings has led the user's impression by executing the above-described process each time distribution information corresponding to Brand "A" is distributed. Furthermore, for example, after distribution information corresponding to Brand "A" is distributed once, the information provision device 10 may generate Content C40 indicating how the distribution information has led the user's impression by executing the above-described process at given time intervals for a given period.

The provision unit 45 may use contexts that belong to a category shared with the determination subject context as the reference contexts. For example, when only specifying a determination subject context is accepted, the provision unit 45 may automatically choose, as reference contexts, contexts of the category shard with the specified determination subject context.

The provision unit 45 may exclude, from the information to be provided, information representing a distributed representation of a context other than the reference contexts and the determination subject context among multiple contexts. For example, when providing a view resulting from projection of a distributed representation space onto a plan surface, the provision unit 45 may generate a view resulting from projection of only the reference contexts and the determination context.

When a given adjective is contained as an anchor together with contexts in the distributed representation space, the provision unit 45 may generate information representing a change of connection between the distributed representation of the given adjective and the distributed representation of the determination subject context. For example, when a demander requests information indicating whether the distribution information has caused the impression of Brand "A" to approximate "luxury", the provision unit 45 may generate information indicating the position of Distributed Representation A relative to the anchor "luxury".

The provision unit 45 may evaluate the distribution information on the basis of the change of the distributed representation of the determination subject context and generate a result of evaluating the distribution information as information representing the change of the distributed representation. For example, when the demander requests information indicating whether the distribution information has caused the impression of Brand "A" to approximate Brand "B", the provision unit 45 specifies a change of the relative similarity between Distributed Representation A and Distributed Representation B and evaluates the distribution information according to the specified change of the similarity. In a more specific example, when the appreciation rate of the relative similarity between Distributed Representation A and Distributed Representation B exceeds a given threshold after the distribution of the distribution information, the provision unit 45 generates an evaluation result indicating that the distribution information has caused the impression of Brand "A" to approximate Brand "B". On the other hand, when the appreciation rate of the relative similarity between Distributed Representation A and Distributed Representation B does not exceed the given threshold or does not change after the distribution of the distribution information or when the relative similarity between Distributed Representation A and Distributed Representation B decreases after the distribution of the distribution information, the provision unit 45 generates an evaluation result indicating that the distribution information has not caused the impression of Brand "A" to approximate Brand "B".

The provision unit 45 distributes the generated various types of information to the demander server 300. As a result, the information provision device 10 is able to provide information representing the effect of the distribution information on the user's impression of the determination subject, thereby realizing evaluation of the effect of the distribution information.

4. Exemplary Flow of Process Information Provision Device Executes

Subsequently, FIG. 7 will be used to describe a flow of a provision process that the information provision device 10 executes. FIG. 7 is a flowchart illustrating an exemplary flow of a provision process that the information provision device according to the embodiment executes. The information provision device 10 is able to execute the process illustrated in FIG. 7 in a predetermined unit and at predetermined timing.

For example, the information provision device 10 generates distributed representations from log data before distribution of distribution information on the basis of the relative connection of contexts (step S101).

Subsequently, the information provision device 10 generates distributed representations from the log data after the distribution of the distribution information on the basis of the relative connection of the contexts (step S102). The information provision device 10 then generates a normalization function to project distributed representations of reference contexts to given positions with respect to anteriority and posteriority of the distribution of the distribution information (step S103).

Furthermore, the information provision device 10 generates content representing a change of the positional relationship between the determination subject context and the reference contexts (step S104). The information provision device 10 provides the generated content as a result of evaluating the distribution information (step S105) and ends the process.

5. Modification

The exemplary provision process and the exemplary calculation process performed by the information provision device 10 have been described; however, the embodiments are not limited thereto. Variations of the provision process and the calculation process that are executed by the information provision device 10 will be described.

5-1. About What to be Evaluated

In the above-described example, the information provision device 10 evaluates the distribution information, such as advertisement information, about a predetermined determination subject represented by the context. The information provision device 10 may provide information for evaluating predetermined distribution information. For example, the information provision device 10 may provide information for evaluating the predetermined distribution information, such as news, web pages, advertisements by posts (that is, native advertisements), or the like. The information provision device 10 may, for example, provide a change of the user's impression of a company that sales a product between anteriority and posteriority of the sale of the product.

In other words, the information provision device 10 not only evaluates various types of information that are delivered to the user via the network but also provides information representing a change between a distributed representation of a determination subject context that is generated before a given event relating to the determination subject context, such as sale of a product or provision of an event, occurs and a distributed representation of the determination subject context that is generated after the given event relating to the determination subject context occurs, thereby properly evaluating the effect of the event on the user's impression.

5-2. Device Configuration

The information provision device 10 may be realized by a front-end server and a back-end server. In such a case, the accepting unit 43 and the provision unit 45, which are illustrated in FIG. 2, are arranged in the front-end server and the collecting unit 41, the generation unit 42 and the acquisition unit 44 are arranged in the back-end server. Each of the databases 31 to 33 registered in the storage unit 30 may be held by an external storage server.

5-3. Other Aspects

Among the processes described in the above-described embodiments, all or part of a process described as being performed automatically may be performed manually and, inversely, all or part of a process described as being performed manually may be performed automatically according to a known method. In addition to this, it is possible to make any change to the procedures, the specific names, and information containing various types of data and parameters illustrated in the descriptions and drawings except as otherwise specifically provided. For example, the various types of information illustrated in the drawings are not limited to the information illustrated in the drawings.

The components of each of the devices illustrated in the drawings are functional concepts and need not necessarily be configured physically as illustrated in the drawings. In other words, specific modes of distribution and integration of each device are not limited to those illustrated in the drawings, and all or part of the devices may be configured by being dispersed or integrated functionally or physically according to various types of loads and the circumstances in which the devices are used.

It is also possible to combine the above-described embodiments as appropriate as long as no inconsistency is caused in the content of the processes.

5-4. Program

The information provision device 10 according to the above-described embodiment is realized by, for example, a computer 1000 having a configuration like that illustrated in FIG. 8. FIG. 8 is a diagram illustrating an exemplary hardware configuration. The computer 1000 has a mode where the computer 1000 is connected to an output device 1010 and an input device 1020 and an arithmetic operation device 1030, a primary storage device 1040, a secondary storage device 1050, an output interface (IF) 1060, an input IF 1070, and a network IF 1080 are connected via a bus 1090.

The arithmetic operation device 1030 operates according to programs that are stored in the primary storage device 1040 and the secondary storage device 1050 and a program that is read from the input device 1020, etc., and executes various types of processes. The primary storage device 1040 is a memory device, such as a RAM, that primarily stores data that is used by the arithmetic operation device 1030 for various types of arithmetic operations. The secondary storage device 1050 is a storage device in which data used by the arithmetic operation device 1030 for various arithmetic operations and various databases are registered, and the secondary storage device 1050 is realized by a read only memory (ROM), a hard disk drive (HDD), a flash memory, or the like.

The output IF 1060 is an interface for transmitting, to the output device 1010, such as a monitor, a printer, or the like, that outputs various types of information to be output. For example, the output IF 1060 is realized by a connector according to standards, such as USB (Universal Serial Bus), DVI (Digital Visual Interface), or HDMI (High Definition Multimedia Interface) (trademark). The input IF 1070 is an interface for receiving information from various input devices 1020, such as a mouse, a keyboard, and a scanner. For example, the input IF 1070 is realized by a USB, or the like.

The input device 1020 may be a device that read information from an optical recording medium, such as a compact disc (CD), a digital versatile disc (DVD) or a phase change rewritable disk (PD), a magneto-optical medium, such as a magneto-optical disk (MO), a tape medium, a magnetic recording medium, or a semiconductor memory. The input device 1020 may be an external storage medium, such as a USB memory.

The network IF 1080 receives data from another device via a network N, transmits the data to the arithmetic operation device 1030, and transmits data that is generated by the arithmetic operation device 1030 to another device via the network N.

The arithmetic operation device 1030 controls the output device 1010 or the input device 1020 via the output IF 1060 and the input IF 1070. For example, the arithmetic operation device 1030 loads programs from the input device 1020 and the secondary storage device 1050 into the primary storage device 1040 and executes the loaded programs.

For example, when the computer 1000 functions as the information provision device 10, the arithmetic operation device 1030 of the computer 1000 realizes the functions of the control unit 40 by executing the program that is loaded into the primary storage device 1040.

6. Effects

As described above, the information provision device 10 generates a distributed representation of each context on the basis of a relative connection that multiple contexts have. The information provision device 10 provides information representing a change between a distributed representation of a determination subject context that is generated before distribution information about the determination subject context is distributed and a distributed representation of the determination subject context that is generated after the distribution information is distributed. Accordingly, the information provision device 10 is able to provide information for evaluating the effect of distribution information on a user's impression of the determination subject.

The information provision device 10 provides information representing a change of a connection between a distributed representation of a reference context and the distributed representation of the determination subject context. For example, the information provision device 10 provides information representing a change between a difference between the distributed representation of the reference context and the distributed representation of the determination subject context that are generated before the distribution information is distributed and a difference between the distributed representation of the reference context and the distributed representation of the determination subject context that are generated after the distribution information is distributed. Accordingly, even in the case where the user's impressions of various contexts change consecutively, the provision device is able to provide a change of the relative connection of the determination subject context with respect to the reference contexts and thus is able to provide information for evaluating the effect of the distribution on the user's impression of the determination subject.

On projecting the distributed representations of the reference contexts to given positions, respectively, the information provision device provides information representing a change of a position to which the determination subject context is projected. For example, the information provision device 10 generates a first function to project the distributed representations of the reference contexts before the distribution of the distribution information to the given positions and a second function to project the distributed representations of the reference contexts after the distribution of the distribution information to the given positions and provides information representing the position to which the distributed representation of the determination subject context before the distribution of the distribution information is projected by the first function and the position to which the distributed representation of the determination subject context after the distribution of the distribution information is projected by the second function. For this reason, the information provision device 10 is able to generate information representing the effect of the distribution information on the user's impression properly and provide the information to the demander.

On projecting the distributed representations of the reference contexts to vertices of a straight line or of a polygon, the information provision device provides information representing a change of a position on the straight line or in an area in the polygon onto which the determination subject context is projected. For this reason, the information provision device 10 is able to generate information visually representing the effect of the distribution information on the user's impression and provide the information to the demander.

Furthermore, the information provision device 10 generates a distributed representation of each context such that the distributed representations of the reference contexts are distant from one another by a given threshold or larger. Accordingly, the information provision device 10 is able to enhance the change of the user's impression of the determination subject context and thus is able to provide information enabling easy evaluation on the effect of the distribution information on the user's impression.

The information provision device 10 sets, for the reference contexts, contexts belonging to a category shared with the determination subject context. Thus, the information provision device 10 is able to provide information that properly evaluates the effect of the distribution information on the user's impression.

The information provision device 10 excludes, from information to be provided, information representing a distributed representation of a context other than the reference contexts and the determination subject context among the multiple contexts. For this reason, the information provision device 10 is able to provide information that enables easy evaluation of the distribution information on the user's impression.

Furthermore, the information provision device 10 provides information representing a history of changes of the distributed representation of the determination subject context. Thus, the information provision device 10 is able to provide the history of changes of the user's impression of the determination subject and thus provide information to properly evaluate the effect of the distribution information on the user's impression.

The information provision device 10 evaluates the distribution information on the basis of the changes of the distributed representation of the determination subject context and provides a result of evaluating the distribution information as information representing the change of the distributed representation. Accordingly, the information provision device 10 is able to provide the evaluation result representing whether the distribution information properly leads the user's impression.

The information provision device 10 generates vectors representing the respective contexts as the distributed representations by using a learner that converts each context into a vector on the basis of the relative connection the contexts have. The information provision device 10 generates a distributed representation of each context from information containing at least any one of content posted by a predetermined user, a history of behaviors of the predetermined user, a history of searches by the given user, and information about a subject of electronic commerce. The information provision device 10 generates a distributed representation of each context on the basis of a relative connection of an impression of a subject represented by each context a predetermined user has. Accordingly, the information provision device 10 provides information representing changes of the distributed representation reflecting the user's impression, thereby providing information to properly evaluate the effect of the distribution information on the user's impression.

The information provision device 10 generates distributed representations of multiple contexts and a given adjective and provides information representing a change of connection between the distributed representation of the given adjective and the distributed representation of the determination subject context. Accordingly, the information providing device 10 is able to use the given adjective as an anchor and provide the information indicating how the user's impression of the determination subject has changed.

The information provision device 10 may provide information representing a change between the distributed representation that is generated before a given event relating to the determination subject context occurs and the distributed representation that is generated after the given event occurs. As a result of the process, the information provision device 10 is able to provide the change of the distributed representation between anteriority and posteriority of the occurrence of the event relating to the determination subject, such as the start of provision of a product or a service or an event hosted by a brand, or a company or a local community, and thus provide information to evaluate whether the event has led the user's impression properly.

The information provision device 10 provides information representing a change between a distributed representation of a determination subject context that is generated before advertisement information that advertises the determination subject context is distributed and a distributed representation of the determination subject context that is generated after the advertisement information is distributed. Accordingly, the information provision device 10 is able to provide information to evaluate whether the advertisement information has led the user's impression of the determination subject properly.

Some embodiments of the present application have been described in detail according to the drawings; however, the embodiments are exemplified only and it is possible to carry out the invention, starting with the mode described in the disclosure part, in other modes where various modifications and improvements are made on the basis of the knowledge of those skilled in the art.

The above-described "section, module or unit" may be read as "means" or "circuit". For example, the provision unit 45 may be read as a provision means or a provision circuit.

According to an aspect of the embodiments, it is possible to provide an index of distribution information that leads the user's impression of a given subject to a given impression.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A provision device comprising:
a network interface configured to receive data based on content that is inputted or viewed by a user over a network; and
a processor programmed to:
accumulate, for each of a plurality of predetermined subjects, a plurality of search queries including a first word indicating the predetermined subject and a second word indicating an impression of the user of the predetermined subject;
generate, for each of the plurality of predetermined subjects, a first vector from a first search query of the plurality of search queries by inputting the second word of the first search query into a model, the first search query being accumulated before distribution information indicating the predetermined subject is distributed, and the model outputting similar vectors in response to receiving similar words as input;
generate, for each of the plurality of predetermined subjects, a second vector from a second search query of the plurality of search queries by inputting the second word of the second search query into the model, the search second query being accumulated after the distribution information is distributed;
generate difference information indicating a difference between each first vector and each corresponding second vector; and
output the difference information.

2. The provision device according to claim 1, wherein the difference information represents a change of a connection between (i) a first predetermined subject of the plurality of predetermined subjects and (ii) a given predetermined subject of the plurality of predetermined subjects, the first predetermined subject serving as a reference for a change to the impression of the given predetermined subject.

3. The provision device according to claim 2, wherein the difference information represents a change between (i) a difference between the first predetermined subject serving as the reference and the given predetermined subject before the distribution information is distributed and (ii) a difference between the first predetermined subject serving as the reference and the given predetermined subject after the distribution information is distributed.

4. The provision device according to claim 1, wherein the difference information represents a change of a connection between (i) a subset of predetermined subjects including more than one of the plurality of predetermined subjects and (ii) a given predetermined subject of the plurality of predetermined subjects, the subset of predetermined subjects serving as multiple references for a change to the impression of the given predetermined subject.

5. The provision device according to claim 4, wherein, on projecting representations of each of predetermined subjects of the subset of predetermined subjects serving as the references to given positions in the difference information, respectively, the processor provides information representing a change of a position in the difference information to which a representation of the given predetermined subject is projected.

6. The provision device according to claim 5, wherein the processor generates a first function to project representations of each of the predetermined subjects of the subset of predetermined subjects serving as the references before the distribution of the distribution information to the given positions and a second function to project representations of each of the predetermined subjects of the subset of predetermined subjects serving as the references after the distribution of the distribution information to the given positions and provides information representing the position to which a representation of the given predetermined subject before the distribution of the distribution information is projected by the first function and the position to which the representation of the given predetermined subject after the distribution of the distribution information is projected by the second function.

7. The provision device according to claim 5, wherein, on projecting representations of each of the predetermined subjects of the subset of predetermined subjects serving as the references to vertices of a straight line or of a polygon in the difference information, the processor provides information representing a change of a position on the straight line or in an area in the polygon onto which a representation of the given predetermined subject is projected.

8. The provision device according to claim 5, wherein the processor generates a representation of the subset of predetermined subjects such that each predetermined subject of the subset of predetermined subjects serving as the references are distant from one another by a given threshold or larger.

9. The provision device according to claim 2, wherein the processor sets, for the first predetermined subject serving as the reference, a predetermined subject belonging to a category shared with the given predetermined subject.

10. The provision device according to claim 4, wherein the processor excludes, from the difference information, information representing a predetermined subject other than (i) the subset of predetermined subjects serving as the references and (ii) the given predetermined subject.

11. The provision device according to claim 1, wherein the difference information represents a history of changes of a given predetermined subject of the plurality of predetermined subjects.

12. The provision device according to claim 1, wherein the processor evaluates the distribution information based on changes to a representation of a given predetermined subject of the plurality of predetermined subjects and provides a result of evaluating the distribution information as the difference information.

13. The provision device according to claim 1, wherein the processor generates each first vector and each second vector by using a learner that converts each predetermined subject into a vector based on a relative connection between the predetermined subjects.

14. The provision device according to claim 13, wherein the processor generates a representation of each predetermined subject from information containing at least one of content posted by the user, a history of behaviors of the user, a history of searches by the user, and information about a subject of electronic commerce.

15. The provision device according to claim 1, wherein
the processor generates representations of a given predetermined subject of the plurality of predetermined subjects and a given adjective, and
the difference information represents a change of connection between the representation of the given adjective and the representation of the given predetermined subject.

16. The provision device according to claim 1, wherein the distributed information is advertisement information that advertises the predetermined subject.

17. The provision device according to claim 1, wherein the processor generates a representation of each predetermined subject based on a relative connection between (i) the impression the user has of each predetermined subject and (ii) each predetermined subject.

18. A provision method executed by a provision device comprising:
receiving, via a network interface in the provision device, data based on content that is inputted or viewed by a user over a network that is connected to the network interface;
accumulating, for each of a plurality of predetermined subjects, a plurality of search queries including a first word indicating the predetermined subject and a second word indicating an impression of the user of the predetermined subject;
generating, for each of the plurality of predetermined subjects, a first vector from a first search query of the plurality of search queries by inputting the second word of the first search query into a model, the first search query being accumulated before distribution information indicating the predetermined subject is distributed, and the model outputting similar vectors in response to receiving similar words as input;
generating, for each of the plurality of predetermined subjects, a second vector from a second search query of the plurality of search queries by inputting the second word of the second search query into the model, the second search query being accumulated after the distribution information is distributed;
generating a difference information indicating a difference between each first vector and each second vector; and
outputting the difference information.

19. A non-transitory computer-readable recording medium having stored a provision program that causes a computer to execute a process comprising:
receiving, via a network interface in the computer, data based on content that is inputted or viewed by a user over a network that is connected to the network interface;
accumulating, for each of a plurality of predetermined subjects, a plurality of search queries including a first word indicating the predetermined subject and a second word indicating an impression of the user of the predetermined subject;
generating, for each of the plurality of predetermined subjects, a first vector from a first search query of the plurality of search queries by inputting the second word of the first search query into a model, the first search query being accumulated before distribution information indicating the predetermined subject is distributed, and the model outputting similar vectors in response to receiving similar words as input;
generating, for each of the plurality of predetermined subjects, a second vector from a second search query of the plurality of search queries by inputting the second word of the second search query into the model, the second search query being accumulated after the distribution information is distributed;
generating a difference information indicating a difference between each first vector and the second vector; and
outputting the difference information.

* * * * *